United States Patent
Lee et al.

(10) Patent No.: US 6,196,526 B1
(45) Date of Patent: Mar. 6, 2001

(54) MECHANICAL WET AIR GENERATOR

(75) Inventors: Hang-Chang Lee, Toayuan; Long Chun Tsai; Ming-Tzung Hsu, both of Hsinchu, all of (TW)

(73) Assignee: Taiwan Semiconductor Manufacturing Company, Ltd, Hsin Chu (TW)

( * ) Notice: Subject to any disclaimer, the term of this patent is extended or adjusted under 35 U.S.C. 154(b) by 0 days.

(21) Appl. No.: 09/366,225

(22) Filed: Aug. 3, 1999

(51) Int. Cl.[7] .............................. B01F 3/04; B01D 19/00
(52) U.S. Cl. ................. 261/94; 96/158; 96/181; 96/219
(58) Field of Search .............................. 96/155, 157, 158, 96/173, 174, 181, 188, 191, 192, 190, 204, 219; 261/94, 95, 96

(56) References Cited

U.S. PATENT DOCUMENTS

| | | | |
|---|---|---|---|
| 2,332,224 | * 10/1943 | Heath et al. | 261/94 |
| 2,888,091 | * 5/1959 | Katz | 96/181 |
| 3,193,989 | * 7/1965 | Sebeste | 96/157 |
| 3,217,469 | * 11/1965 | Eckert | 96/181 |
| 4,659,347 | * 4/1987 | Schrems | 96/192 |
| 5,242,626 | * 9/1993 | Oshima | 261/94 |
| 5,971,368 | * 10/1999 | Nelson et al. | 261/94 |

\* cited by examiner

*Primary Examiner*—Duane S. Smith
(74) *Attorney, Agent, or Firm*—Tung & Associates

(57) ABSTRACT

A mechanical wet air generator which is constructed by an inner container, an outer container, a fluid level controller and a multiplicity of Rashing rings filled in the inner container is provided. In the wet air generator, the inner container is formed of honeycomb panels such that large bubbles cannot go through and furthermore, the multiplicity of Rashing rings functions as bubble-breaking solid shapes further prevents large bubbles from exiting the wet air generator and insuring the proper functioning of the generator. The present invention novel mechanical wet air generator is provided with a fluid level controller which consists of a floater, a floating valve, and a linkage connecting thereinbetween. The novel fluid level controller effectively prevents any possibility of overflow of fluid, or water, into a slurry supply pipe to which the wet air generator supplies a wet air or wet $N_2$ for transporting and for blanketing the slurry solution. The present invention novel wet air generator effectively increases the % RH of clean dry air from 10~40% to 70~99%.

20 Claims, 4 Drawing Sheets

MECHANICAL WET AIR GENERATOR

FIELD OF THE INVENTION

The present invention generally relates to a mechanical wet air generator and more particularly, relates to a mechanical wet air generator that is equipped with an inner container and an outer container with a fluid level controller situated in the outer container and a multiplicity of Rashing rings situated in the inner container for breaking up bubbles and for maximizing wet surface areas for contact with an input air flow to produce a wet air output. The present invention mechanical wet air generator may optionally contain a demister connected in series with and downstream of the wet air generator for separating over-saturated water from the wet air.

BACKGROUND OF THE INVENTION

Mechanical wet air generators, or wet $N_2$ generators have been used in the chemical processing industry for providing wet air or wet $N_2$. Normally, a clean dry air (CDA) or a $N_2$ gas contains between about 20% and about 30% RH (relative humidity) which is not suitable for many chemical processes wherein a wet air blanket or a wet $N_2$ blanket is necessary.

For instance, in a slurry supply tank used for an oxide slurry supply system for chemical mechanical polishing, a wet $N_2$ blanket must be used to shield the slurry solution from dry air and to dispense the slurry without drying the slurry particles. When the $N_2$ gas used has a low water content, i.e., at 20~30% RH, some of the slurry particles tend to dry up and adhere to other particles and forms particles in forming particles of significantly larger size. This presents a serious scratching problem when the slurry solution is subsequently dispensed on a wafer surface for polishing. In a normal slurry solution, the composition ratio between solids and water is approximately 1:1. When the nitrogen blanket or the clean dry air blanket covering the slurry solution contains less than 30% RH, the water content in the slurry may further vaporize and thus causing the formation of larger particles. The use of a wet $N_2$, or a wet CDA blanket over a slurry solution is therefore an important processing step that must be carried out in order to assure the reliability of the CMA process.

Conventionally, wet air or wet $N_2$ is provided by a wet air generator or a wet $N_2$ generator such as that shown in FIGS. 1 and 2. FIG. 1 shows a wet $N_2$ generator 10 constructed of three wet $N_2$ generation chambers 12. In each of the generation chamber, a gas/water inlet 14 is provided at the bottom of the chamber. A mixture of $N_2$ gas and water is pumped into inlet 14 through a flow control apparatus 20. Each of the wet $N_2$ generator 12, also shown in FIG. 2, is filled with a filter-type material for retaining water and for maximizing the contact area with nitrogen gas that is fed therethrough. The wet $N_2$ generator chambers 12 are further equipped with heating means (not shown) such that water may be heated inside the chamber to further increase the humidity content of $N_2$ gas purged therethrough. The water level in each of the generator chamber 12 is controlled by level sensors "H" for high level detection and "L" for low level detection. These are shown in FIG. 1 as 22 for the high level sensor and 24 for the low level sensor. The nitrogen gas which carries moisture then exits the wet $N_2$ outlet 28 mounted at the top of each of the wet $N_2$ generator chamber 12.

The conventional wet $N_2$ generator shown in FIGS. 1 and 2, even though widely used, presents many processing disadvantages. First, large bubble formation in the wet $N_2$ generator chambers frequently causes the malfunction of the water level sensors. The malfunction causes the level sensors to be turned on and off constantly and furthermore, causes water to overflow into a slurry piping. The constant turn on and off of the level sensors further necessities frequent adjustments and maintenance procedures to be performed. Moreover, the conventional wet $N_2$ generator chambers are not equipped with protection devices for preventing overflow of water into the slurry piping which dilutes the slurry solution, decreases its concentration and thus makes the process control of the CMP process very difficult. The conventional wet $N_2$ generator chambers are not equipped with means for removing over-saturated water contained in wet $N_2$. The large bubbles produced further reduces the wetting effect of water such that a higher heating temperature of water is equipped leading to a more difficult to control process.

It is therefore an object of the present invention to provide a mechanical wet air generator does not have the drawbacks or shortcomings of the conventional generators.

It is another object of the present invention to provide a mechanical wet air generator that is equipped with an inner container formed of perforated panels situated inside an outer container of fluid-tight construction for establishing fluid communication with an inner cavity of the inner container.

It is a further object of the present invention to provide a mechanical wet air generator that is capable of producing either wet air or wet $N_2$.

It is another further object of the present invention to provide a mechanical wet air generator that is equipped with a reliable fluid level controller for controlling the fluid level in the generator such that an overflow of fluid into a slurry pipe is prevented.

It is still another object of the present invention to provide a mechanical wet air generator that is equipped with an inner container filled with a multiplicity of bubble-breaking solid shapes for preventing the formation of large bubbles.

It is yet another object of the present invention to provide a mechanical wet air generator which is capable of producing wet air or wet $N_2$ that contains at least 90% relative humidity.

It is still another further object of the present invention to provide a mechanical wet air generator that is further equipped with a demister in series connected and downstream to the wet air generator for separating over-saturated water from the wet air.

It is yet another further object of the present invention to provide a mechanical wet air generator that is equipped with an inner container further includes a heater and a thermocouple for controlling a temperature of the fluid contained in the cavity of the inner container.

SUMMARY OF THE INVENTION

In accordance with the present invention, a mechanical wet air generator that is equipped with an inner container, an outer container, a fluid level controller and a multiplicity of bubble-breaking solid shapes in the inner container that is effective in producing wet air substantially without bubbles is provided.

In a preferred embodiment, a mechanical wet air generator is provided which includes an inner container formed of perforated panels defining an inner cavity therein, the inner cavity is filled with a multiplicity of bubble-breaking solid shapes and a fluid, an outer container of fluid-tight construction for holding the inner container therein and for establishing fluid communication with the inner cavity in the inner container, a fluid level controller situated in the outer container for controlling a fluid level in the inner and outer containers by opening/closing a fluid inlet, an air inlet and an air outlet in the outer container, the air inlet is adapted for directing an air flow towards a bottom of the inner container and the air outlet is adapted for outputting wet air from a top portion of the cavity of the outer container.

In the mechanical wet air generator, the air flow may be a nitrogen gas flow or a clean dry air flow. The inner container may be formed of honeycombed panels for penetrating a fluid therethrough and for breaking large bubbles. The wet air generator may be a wet $N_2$ generator. The air flow through the air inlet may be a clean dry air or $N_2$.

In the mechanical wet air generator, the multiplicity of bubble-breaking solid shapes is Rashing ring for preventing formation of large bubbles. The fluid level controller may include a floater, a floating valve and a linkage connecting therein between. The inner container may further include a heater and a thermocouple for controlling a temperature of the fluid in the inner cavity. The air inlet may further include an air flow regulator and a plurality of air nozzles. The wet air generator may further include a demister connected in series with the air outlet of the wet air generator for separating over-saturated water from the wet air.

In another preferred embodiment, a mechanical wet air generator for producing wet air or wet $N_2$ can be provided which includes an inner container, formed of perforated panels defining an inner cavity therein, the inner cavity is filled with a multiplicity of bubble-breaking solid shapes and a fluid, an outer container of fluid-tight construction for holding the inner container therein and for establishing fluid communication with the inner cavity in the inner container, a fluid level controller situated in the outer container for controlling a fluid level in the inner and outer containers by opening/closing a fluid inlet, an air inlet and an air outlet in the outer container, the air inlet is adapted for directing an air flow towards a bottom of the inner container and the air outlet is adapted for outputting wet air from a top portion of the cavity of the outer container and a demister having an air inlet connected to an air outlet on the outer container for separating over-saturated water from the wet air and for outputting a treated wet air.

In the mechanical wet air generator that is equipped with a demister, the air flow through the air inlet may have a relative humidity of between about 10% and about 40%. The treated wet air may have a relative humidity between about 70% and about 99%. The air flow may be a nitrogen gas flow. The air flow through the air inlet may be clean dry air or $N_2$. The multiplicity of bubble-breaking solid shapes may be Rashing ring for preventing formation of large bubbles.

In the mechanical wet air generator for producing wet air or wet $N_2$, the inner container may be formed of honeycombed panels for flowing of a fluid therethrough and for breaking up large bubbles. The inner container may further include a heater and a thermocouple for controlling a temperature of the fluid in the inner cavity. The fluid level controller may further include a floater, a floating valve and a linkage connecting therein between. The air inlet may further include an air flow regulator and a plurality of air nozzles.

BRIEF DESCRIPTION OF THE DRAWINGS

These objects, features and advantages will become apparent by an examination of the following specification and the appended drawings in which.

DETAILED DESCRIPTION OF THE PREFERRED EMBODIMENT

Figure 1:
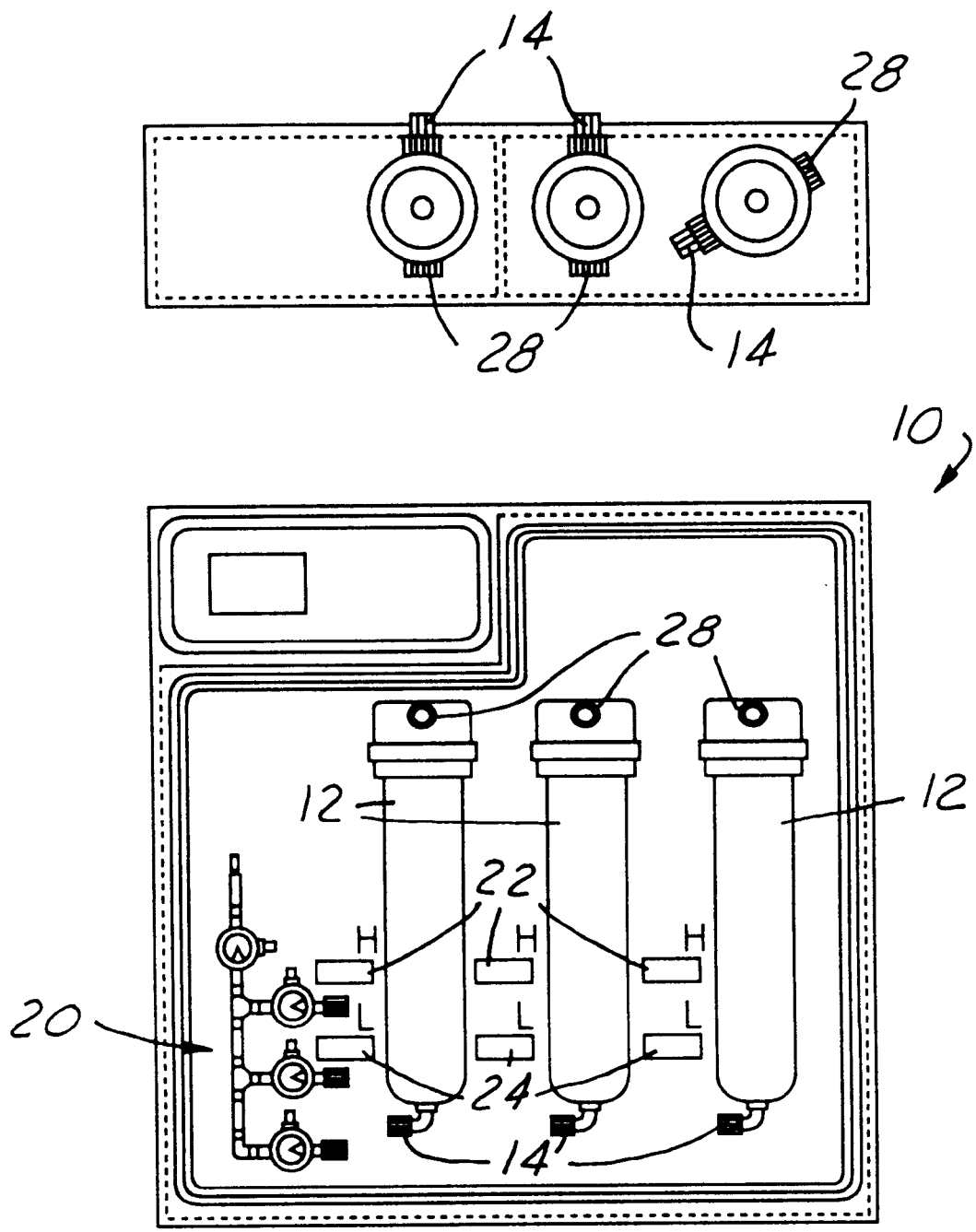
FIG. 1 is a side view and a plane view of a conventional wet $N_2$ generator.
Figure 2:
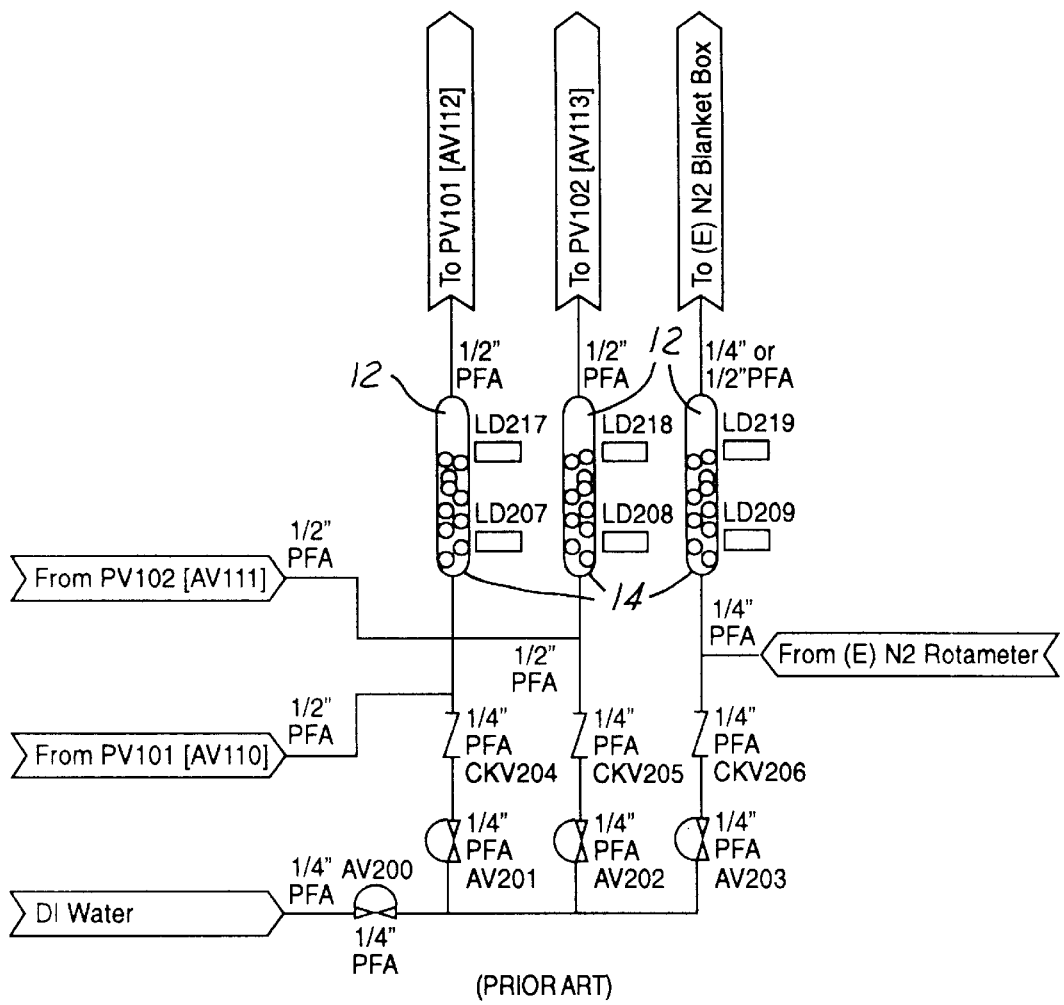
FIG. 2 is an illustration of the flow control system for the conventional wet $N_2$ generator of FIG. 1.

The present invention discloses a mechanical wet air generator that does not have the drawbacks or shortcomings of the conventional wet air generators in that it is equipped with a fluid level controller which reliably controls the fluid level in the generator and thus preventing accidental overflow of fluid into a slurry piping. The problem frequently seen in the conventional wet air generators when water flows into a slurry piping and thus diluting the slurry solution and causing processing difficulties in a CMP process is prevented.

The present invention wet air generator, or wet $N_2$ generator can be used to effectively prevents the generation of large bubbles in the system by utilizing a multiplicity of bubble-breaking solid shapes in the chamber for breaking up large bubbles. In the present invention wet air generator, an inner container is formed of honeycombed panels such that large bubbles cannot flow therethrough to further prevent large bubbles from entering into the wet air outlet at the top of the generator.

The present invention wet air generator can reliably produce a wet air or wet $N_2$ that contains at least 90% relative humidity to provide for slurry dispensing and for blanketing an oxide slurry supply system. By utilizing the present invention wet air generator, improved efficiency of humidification can be achieved and catastrophe caused by water overflowing into a slurry supply line can be prevented.

The present invention wet air generator can be further equipped, optionally, with a demister for removing condensed water, or over-saturated water from the wet air to keep the desirable quality of the wet air.

The improvement in efficiency of humidification by the present invention wet air generator is achieved by minimizing the bubble sizes and by preventing the formation of large bubbles. In the present invention mechanical wet air generator, the humidity level in wet air can be suitably adjusted by either adjusting the number of Rashing rings in the generator or by adjusting the water temperature. The present invention novel wet air generator further utilizes a reliable level sensor for the automatic control of water refill. A problem frequently seen in the conventional wet air generator due to malfunction of level sensors is thus eliminated.

In the present invention wet air generator, the relative humidity produced in the wet air can be adjusted by controlling the temperature of the fluid contained in the generator. The temperature control can be achieved by a heater and a thermostat installed in an inner container of the generator. An air inlet is equipped with a plurality of air nozzles such that air goes through nozzles into the fluid to produce small size uniform bubbles, while the honeycomb panels and the Rashing rings in the inner container minimizes large bubble formation. The relative humidity level of the wet air or wet $N_2$ can be increased by increasing the quantity of the Rashing rings. The required level of relative humidity in the wet air may also be met by adjusting the temperature of the fluid in the inner container.

The fluid flow controller of the present invention generator further includes a floater, a floating valve and a linkage connected therebetween. A water refill function performed by opening the plug is controlled by the floater and the floating valve. A sight tube is connected to the inner container for visual verification of the water level in the container which further prevents any possible overflow of fluid into the slurry supply piping.

Figure 3:
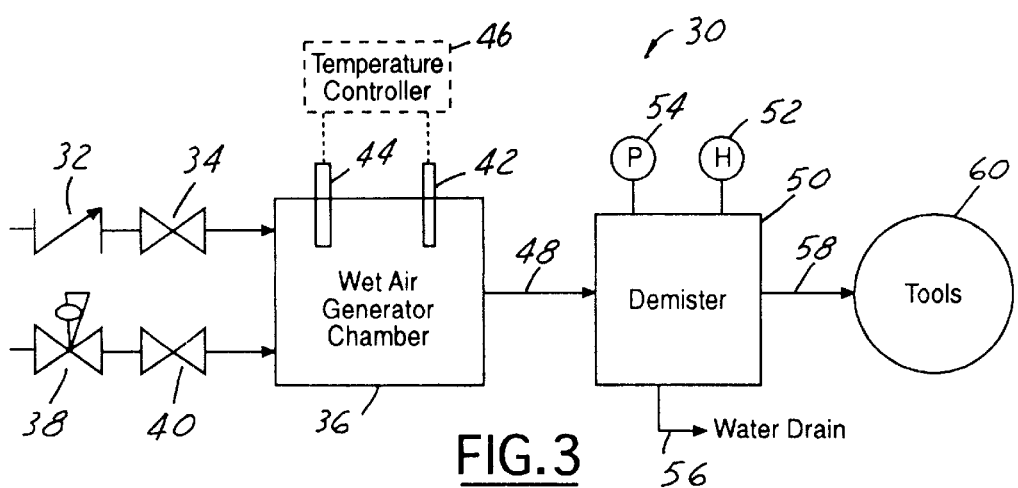
FIG. 3 is an illustration of a process flow chart for the present invention wet air generator.

Referring now to FIG. 3 wherein an illustration of the process flow of the present invention wet air generator 30 is shown. In the present invention wet air generator 30, a water inlet check valve 32 and a water stop valve 34 are connected in series for feeding water into the wet air generator chamber 36. An air flow regulator 38 and an air flow stop valve 40 are further utilized for feeding an air of controlled pressure into the chamber 36. Detailed graphs showing the arrangement in the wet air generation chamber 36 is further shown in FIGS. 4A, 4B and 4C. The wet air generator chamber 36 is further provided with a thermocouple 42 and a heater 44 both are connected to a temperature controller 46. The temperature controller 46 controls the temperature of the fluid, or water, inside the chamber 36. Wet air 48 produced by the wet air generator chamber 36 is flown into a demister 50 which is equipped with a humidity gauge 52, a pressure gauge 54 and a water drain 56. After separation of the over-saturated water from the wet air 48, a treated wet air 58 is flown to a process tool 60.

Figure 4A:
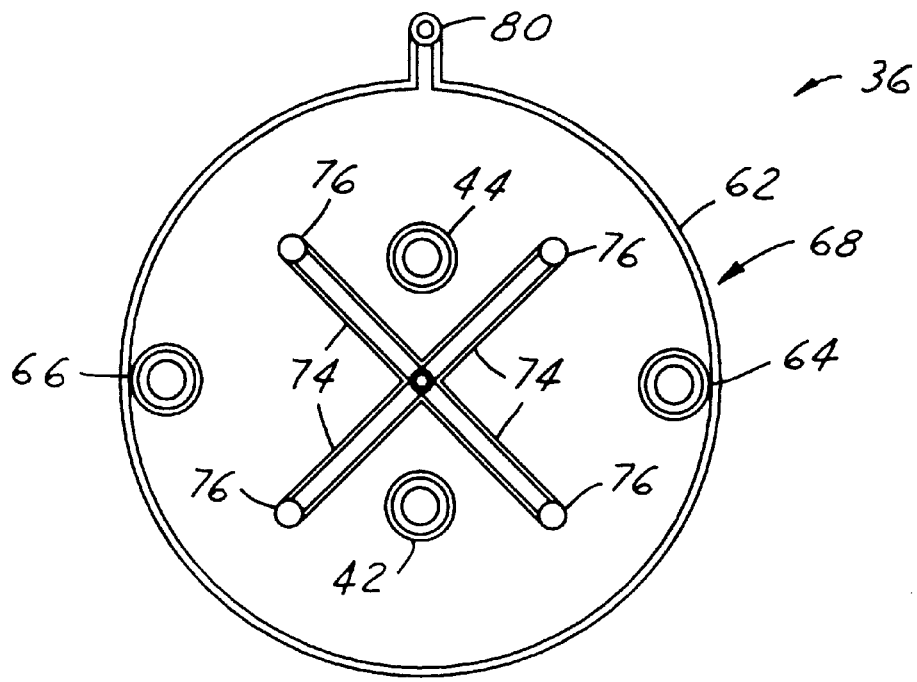
FIG. 4A is a plane view of the present invention wet air generator chamber.
Figure 4B:
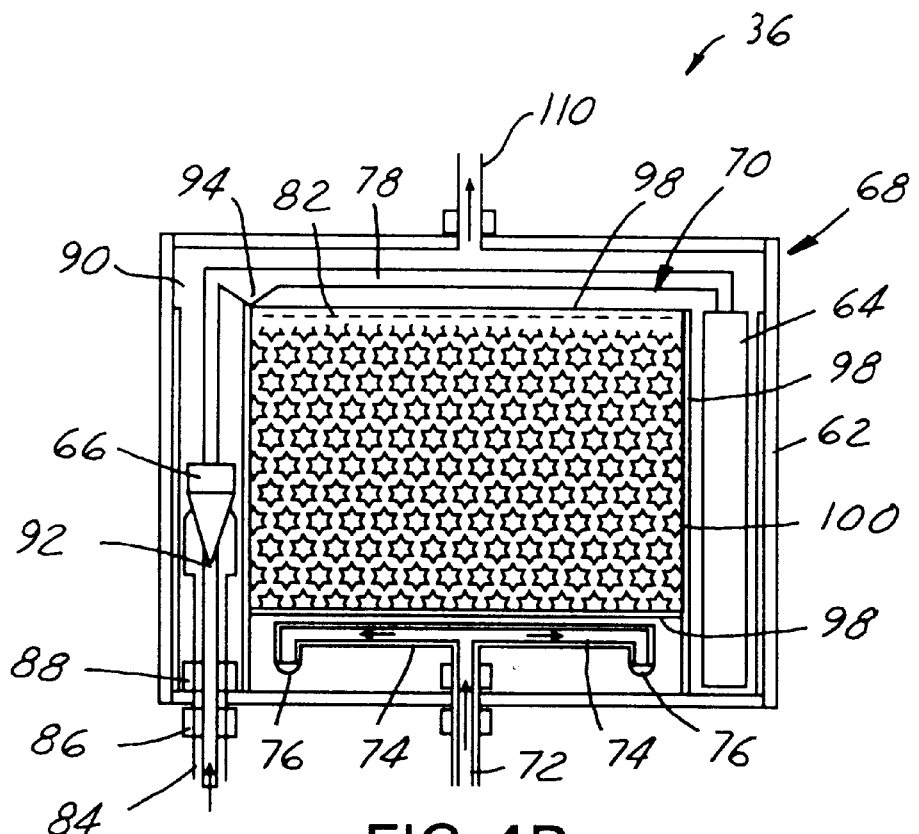
FIG. 4B is a cross-sectional view of the present invention wet air generator.

FIG. 4A shows a plane view of the wet air generator chamber 36, except that the honeycomb walls (see FIG. 4B) is not shown. As shown in FIG. 4A, within the outer container wall 62, is, a floater 64 and a plug, or floating valve 66. These are also shown in FIG. 4B in a cross-sectional view. Within the outer container 68, and under the inner container 70, is provided an air inlet pipe 72 divided into four branches 74 each having an air nozzle 76 at its tip portion. As shown in FIG. 4A, the outer container 68 is further provided with a sight tube 80 for easy identification of the water level inside the wet air generator chamber 36 and further provides a safety check to prevent any possible overflow of water from the wet air generator chamber 36.

The fluid level controller provided in the present invention wet air generator 36 consists of a floater 64, a floating valve (or plug) 66 and a linkage (or arm) 78. A water level 82 can be suitably controlled by the fluid level controller utilized in the present invention generator 36.

As shown in FIG. 4B, water, or any other fluid enters a fluid inlet 84 which is provided with a flow regulator 86 and a heating means 88 such that a desirable quantity of the fluid at a suitable temperature can be flown into the cavity 90 of the outer container 68. The floater 64 can be suitably adjusted, or made of a suitable material that it shuts off the water flow into the chamber cavity 90 by plug 66 when a large enough buoyant force is exerted on the floater 64. The plug 66 shuts off the inlet pipe opening 92 shown in FIG. 4B. The linkage or arm 78 of the fluid level controller pivots at a pivoting point 94 for operating the plug 66.

Also shown in FIGS. 4B and 4A is an air inlet pipe 72 which is divided into four branch pipes 74 each equipped with an air nozzle 76 for injecting a clean dry air or a nitrogen gas into the fluid in the chamber cavity 90.

Inside the inner container 70, which is formed by honeycomb panels 98 for providing fluid communication with the outer container cavity 90, is filled bubble-breaking solid shapes 100 which are frequently called Rashing rings. The Rashing rings 100 provide suitable control of the bubble size such that no large size bubbles can be produced during the traveling of air or $N_2$ from the bottom of the inner container 70 to the top of the container exiting through air outlet 10.

Figure 4C:
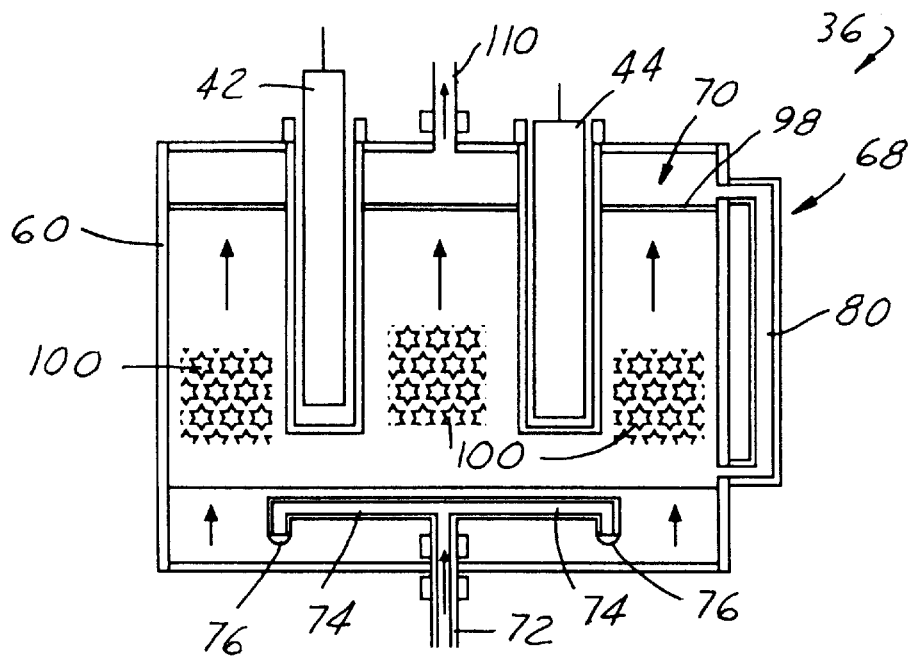
FIG. 4C is another cross-sectional view of the present invention wet air generator taken in a perpendicular direction from that shown in FIG. 4B.

FIG. 4C shows another cross-sectional view of the present invention wet air generator in a direction perpendicular to that shown in FIG. 4B. A cross-sectional view through the heater 44 and the thermocouple 42 is shown in FIG. 4C, while a cross-sectional view through the floater 64 and the plug 66 is shown in FIG. 4B.

The desirable amount of relative humidity in the air or nitrogen flown through the wet air or wet $N_2$ generator can be controlled by two major factors. First, by the temperature of the fluid, or water contained in the generator through the use of the heater, the thermocouple and the temperature controller shown in FIG. 3. The higher the water temperature in the generator, the higher the relative humidity content of the air passing through the generator. A second major factor that controls the amount of relative humidity in the air or nitrogen is the number of multiplicity of bubble-breaking solid shapes 100 (or Rashing rings) used. The more the Rashing rings utilized in the generator, the higher the percent relative humidity can be produced in the wet air or wet $N_2$.

The present invention novel wet air generator may further include, optionally, a demister which is connected in series and in fluid communication with the wet air generator. This is shown in FIG. 5.

A demister 50, also shown in FIG. 3, is equipped with a demister chamber 120, a humidity gauge 52, a pressure gauge 54, an air inlet 122, an air outlet 124 and a water outlet 126. A floater 130 controls the discharge of water through outlet 126 when water cumulates inside the chamber 120. Over-saturated water contained in the wet air 48 the travels into the chamber cavity drops to the bottom of the chamber cavity while wet air enters an inner tube 130 and exits as treated wet air 58 through the air outlet 124. The demister 50 utilized in the present invention can be suitably connected to the wet air generator 36 by an in-series connection downstream to the wet air generator 36. For instance, the air outlet 110 of the wet air generator 36 (shown in FIG. 4C) may be advantageously connected to the air inlet 122 of the demister 50 (shown in FIG. 5). By utilizing the optional demister, the present invention novel wet air generator further insures that no overflow of fluid, or water, goes into a slurry supply pipe and thus further guarantees the proper functioning of the present invention wet air generator.

Figure 5:
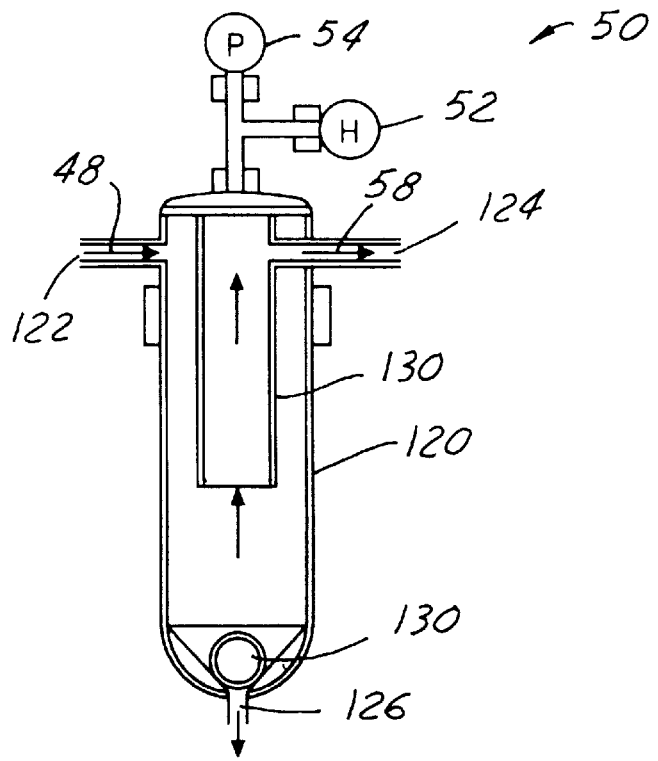
FIG. 5 is a cross-sectional view of a demister used in the present invention wet air generator.

The present invention novel mechanical wet air generator has therefore been amply described in the above descriptions and in the appended drawings of FIGS. 3~5.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

What is claimed is:

1. A mechanical wet air generator comprising:
    an inner container formed of perforated panels defining an inner cavity therein, said inner cavity being filled with a multiplicity of bubble-breaking solid shapes and a fluid, an outer container of fluid-tight construction for holding said inner container therein and for establishing fluid communication with said inner cavity in said inner container, a fluid level controller situated in said outer container for controlling a fluid level in said inner and outer containers by opening/closing a fluid inlet, and a fluid inlet, an air inlet and an air outlet in said outer container, said air inlet adapted for directing an air flow toward a bottom of said inner container and said air outlet adapted for outputting wet air from a top of said outer cavity of said outer container.

2. A mechanical wet air generator according to claim 1, wherein said air flow being a nitrogen gas flow.

3. A mechanical wet air generator according to claim 1, wherein said inner container being formed of honeycomb panels for penetration of a fluid therethrough.

4. A mechanical wet air generator according to claim 1, wherein said wet air generator being a wet $N_2$ generator.

5. A mechanical wet air generator according to claim 1, wherein said air flow through said air inlet being CDA (clean dry air) or $N_2$.

6. A mechanical wet air generator according to claim 1, wherein said multiplicity of bubble-breaking solid shapes is Rashing rings for preventing formation of large bubbles.

7. A mechanical wet air generator according to claim 1, wherein said fluid level controller comprises a floater, a floating valve and a linkage connecting therein between.

8. A mechanical wet air generator according to claim 1, wherein said inner container further comprises a heater and a thermocouple for controlling a temperature of said fluid in said inner cavity.

9. A mechanical wet air generator according to claim 1, wherein said air inlet further comprises an air flow regulator and a plurality of air nozzles.

10. A mechanical wet air generator according to claim 1 further comprising a demister connected in series with said air outlet of the wet air generator for separating over-saturated water from said wet air.

11. A mechanical wet air generator for producing wet air or wet $N_2$ comprising:

an inner container formed of perforated panels defining an inner cavity therein, said inner cavity being filled with a multiplicity of bubble-breaking solid shapes and a fluid, an outer container of fluid-tight construction for holding said inner container therein and for establishing fluid communication with said inner cavity in said inner container, a fluid level controller situated in said outer container for controlling a fluid level in said inner and outer containers by opening/closing a fluid inlet, and a fluid inlet, an air inlet and an air outlet in said outer container, said air inlet adapted for directing an air flow toward a bottom of-said inner container and said air outlet adapted for outputting wet air from a top of said outer cavity of said outer container, and a demister having an air inlet connected to said air outlet on said outer container for separating over-saturated water from said wet air and for outputting a treated wet air.

12. A mechanical wet air generator for producing wet air or wet $N_2$ according to claim 11, wherein said air flown through said air inlet having relative humidity between about 10% and about 40%.

13. A mechanical wet air generator for producing wet air or wet $N_2$ according to claim 11, wherein said treated wet air having a relative humidity between about 70% and about 99%.

14. A mechanical wet air generator for producing wet air or wet $N_2$ according to claim 11, wherein said air flow being a nitrogen gas flow.

15. A mechanical wet air generator for producing wet air or wet $N_2$ according to claim 11, wherein said air flown through said air inlet being CDA (clean dried air) or $N_2$.

16. A mechanical wet air generator for producing wet air or wet $N_2$ according to claim 11, wherein said multiplicity of bubble-breaking solid shapes is Rashing rings for preventing formation of large bubbles.

17. A mechanical wet air generator for producing wet air or wet $N_2$ according to claim 11, wherein said inner container being formed of honeycomb panels for penetration of a fluid therethrough.

18. A mechanical wet air generator for producing wet air or wet $N_2$ according to claim 11, wherein said inner container further comprises a heater and a thermocouple for controlling a temperature of said fluid in said inner cavity.

19. A mechanical wet air generator for producing wet air or wet $N_2$ according to claim 11, wherein said fluid level controller comprises a floater, a floating valve and a linkage connecting therein between.

20. A mechanical wet air generator for producing wet air or wet $N_2$ according to claim 11, wherein said air inlet further comprises an air flow regulator and a plurality of air nozzles.

* * * * *